UNITED STATES PATENT OFFICE.

BUEL F. BARTLETT, OF DUNKIRK, NEW YORK.

LUBRICATING COMPOUND.

SPECIFICATION forming part of Letters Patent No. 294,840, dated March 11, 1884.

Application filed January 14, 1884. (No specimens.)

*To all whom it may concern:*

Be it known that I, BUEL F. BARTLETT, of Dunkirk, in the county of Chautauqua, and in the State of New York, have invented certain new and useful Improvements in Lubricating Compounds; and I do hereby declare that the following is a full, clear, and exact description thereof.

My invention relates to lubricating compounds; and it consists in a certain composition of matter, as will be more fully set forth hereinafter.

My compound in its marketable condition is a powder composed of the several ingredients mixed together in the proportions hereinafter specified, and I prefer to sell it in that condition, to be afterward mixed with oil or added to the oiled waste in a packing-box, as desired for use from time to time.

The ingredients comprising my compound are graphite, dairy-salt, flour of sulphur, and ground gypsum or "hard plaster," which are treated as follows: All of these substances are ground fine or reduced to a pulverized condition, and then very thoroughly mixed. In making, say, one hundred and fifty pounds of my compound, I would use, preferably, the following proportions: graphite, one hundred pounds; dairy-salt, twenty-five pounds; flour of sulphur, fifteen pounds, and gypsum ten pounds.

I do not confine myself to the exact proportions of the several ingredients, as they may be varied somewhat to suit the class and condition of machinery to which the compound is to be applied; but the formula given I have found to be satisfactory in a majority of cases.

This compound is to be applied in the powdered state to rolling-stock journals packed with oil and waste by placing it on the waste in the packing-box in such quantity and position as will insure its being brought in contact with the journal. The compound may be applied to machinery-bearings not packed with waste by carefully mixing it with any suitable lubricating-oil.

Having thus described my invention, what I claim as new, and desire to secure by Letters Patent, is—

A lubricating compound consisting of graphite, dairy-salt, flour of sulphur, and gypsum, mixed together in substantially the proportions set forth.

In testimony that I claim the foregoing I have hereunto set my hand, at Elmira, in the county of Chemung and State of New York, in the presence of two witnesses.

BUEL F. BARTLETT.

Witnesses:
O. H. WHEELER,
P. J. LYNCH.